United States Patent
Varadarajan et al.

(10) Patent No.: US 8,548,866 B2
(45) Date of Patent: Oct. 1, 2013

(54) METHODS AND SYSTEMS TO SUPPLEMENT A LISTING VIA A THIRD PARTY TRUST PROVIDER

(75) Inventors: Dilip Varadarajan, San Jose, CA (US); Naoki Ogishi, Redwood City, CA (US); Balaji Thallam Parthasarathy, Sunnyvale, CA (US); Bin Gong, San Jose, CA (US); Danny Chang, Los Altos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/486,869

(22) Filed: Jun. 1, 2012

(65) Prior Publication Data

US 2012/0239530 A1   Sep. 20, 2012

Related U.S. Application Data

(63) Continuation of application No. 12/917,358, filed on Nov. 1, 2010, now Pat. No. 8,200,543.

(60) Provisional application No. 61/257,765, filed on Nov. 3, 2009.

(51) Int. Cl.
  *G06Q 30/00* (2012.01)
(52) U.S. Cl.
  USPC ............................................. 705/26.1
(58) Field of Classification Search
  USPC ............................................. 705/26.1
  See application file for complete search history.

(56) References Cited

U.S. PATENT DOCUMENTS

| | | | |
|---|---|---|---|
| 7,778,841 B1 * | 8/2010 | Bayer et al. | 705/306 |
| 8,200,543 B2 | 6/2012 | Varadarajan et al. | |
| 2005/0177528 A1 * | 8/2005 | Qamar | 705/404 |
| 2009/0187465 A1 * | 7/2009 | Leggetter et al. | 705/10 |
| 2010/0153831 A1 | 6/2010 | Beaton | |
| 2012/0109780 A1 | 5/2012 | Varadarajan et al. | |

OTHER PUBLICATIONS

U.S. Appl. No. 12/917,358, Non Final Office Action mailed Sep. 8, 2011, 8 pgs.
U.S. Appl. No. 12/917,358, Notice of Allowance mailed Feb. 17, 2012, 10 pgs.
U.S. Appl. No. 12/917,358, Response Filed Dec. 8, 2011 to Non-Final Office Action Received Sep. 8, 2011, 8 pgs.
U.S. Appl. No. 12/917,358, Supplemental Notice of Allowability mailed Mar. 21, 2012, 3 pgs.
U.S. Appl. No. 61/257,765, Application filed Nov. 3, 2009, 47 pgs.
Miller, Sabrina, "How to check Series: Reborn Wrecks", St. Petersburg Times, [Online]. Retrieved from the Internet: <http://proquest.umi.com/pgdweb?did=51859533&sid=1&Fmt=3&clientId=19649&RQT=309&VName=PQD>, 10 pgs.

* cited by examiner

*Primary Examiner* — Mila Airapetian
(74) *Attorney, Agent, or Firm* — Schwegman Lundberg & Woessner, P.A.

(57) ABSTRACT

Various embodiments include a method and system to request supplemental trust information (STI), from over a network, from a third party trust provider. The requesting uses a first predetermined criterion from an item listing that describes a particular item that is offered for sale on a network-based marketplace. The STI includes history information for the particular item that is generated by the third party trust provider. The system then stores and presents at least a portion of the STI.

23 Claims, 8 Drawing Sheets

METHODS AND SYSTEMS TO SUPPLEMENT A LISTING VIA A THIRD PARTY TRUST PROVIDER

RELATED APPLICATIONS

This patent application claims the priority benefit of U.S. application Ser. No. 12/917,358, filed Nov. 1, 2010 which claims the priority benefit of U.S. Provisional Application Ser. No. 61/257,765, filed on Nov. 3, 2009, entitled "METHODS AND SYSTEMS TO SUPPLEMENT A LISTING VIA A THIRD PARTY TRUST PROVIDER," all of which are hereby incorporated herein by reference.

FIELD

Embodiments relate generally to the technical field of data communications and, in one example embodiment, to supplementing a listing via a third party trust provider.

BACKGROUND

Network-based marketplaces generally allow customers to purchase items online. Some network-based marketplaces facilitate the listing of items from a seller and the purchase of those items by a buyer. Network-based marketplaces typically strive to achieve a pleasant experience for buyers in order to increase revenue. Part of this experience is often a wide selection of quality products from which a buyer may choose. Often, the network-based marketplace cannot verify the quality or other attributes of products that are listed by sellers. Sometimes, inattentive or even unscrupulous sellers may list items in a way which misrepresents or omits data important to a buyer making an informed decision to purchase the item. For example, the authenticity of a painting may be disputed. Knowing whether or not the painting is a forgery would likely influence the price a buyer would be willing to pay for the painting. The presence of item listings misrepresenting the items in those listings may adversely impact the buyer's experience with the network-based marketplace, reducing trust and use of the network-based marketplace and thereby decreasing the network-based marketplace's revenue.

Network-based marketplaces typically attempt to combat poor seller behavior by using a reporting system. For example, buyers may be able to rank various attributes of a seller that others may see. Typically such ranking systems are broadly focused on aggregating the behavior of the seller so that users may infer, for example, future trustworthiness based on past actions. In other examples, a party may report specific abuses which the network-based marketplace may then investigate and act upon. Typically such reporting systems are time intensive, as false claims may be numerous, and also expensive because of the manual interventions involved.

BRIEF DESCRIPTION OF THE DRAWINGS

Some embodiments are illustrated by way of example and not limitation in the figures of the accompanying drawings in which.

DETAILED DESCRIPTION

Example methods and systems to supplement a listing via a third party trust provider are described. In the following description, for purposes of explanation, numerous specific details are set forth in order to provide a thorough understanding of an embodiment of the present disclosure. It will be evident, however, to one of ordinary skilled in the art that the present disclosure may be practiced without these specific details.

The example embodiments described herein seek to assist sellers that have listed items for sale on a network-based marketplace and buyers that are attempting to evaluate such items according to the claims and descriptions presented by the seller. Such items may be supplemented or augmented with supplemental trust information that is provided by a third party trust provider, stored in a listing for the item, and presented to the buyers evaluating such items. Items may be any good or service that may be sold or auctioned on a network-based marketplace. While many of the example embodiments are discussed in the context of Vehicle History Report (VHR) and VHR Summary Data that is generated based on a VHR received from a provider of such reports, it will be appreciated that the methods and systems described herein may be applied to a broad range of items (e.g., antiques, crafts, artistic creations, gems, musical instruments, motorcycles, boats, etc.) that may be evaluated based on predetermined criteria by a third party trust provider.

Network-based marketplaces using supplemental trust information may avoid some of the pitfalls inherent in previous practices to curb seller abuse or inattentiveness. For example, because the supplemental trust information is directed to a currently listed item, buyers do not have to rely on general information about a seller's past trustworthiness when evaluating that particular item. Further, the automated nature of incorporating the supplemental trust information avoids the manual costs associated with investigating and acting on reports of seller abuse. Thus, buyers can receive additional information to make informed purchasing decisions. The buyers may also trust such information due to its source. Additional benefits may accrue to good sellers in the network-based marketplace as they will be able to differentiate their products from those of other sellers. The benefits to buyers and sellers may increase participation from both groups in the network-based marketplace and thus increase revenues.

Figure 1:
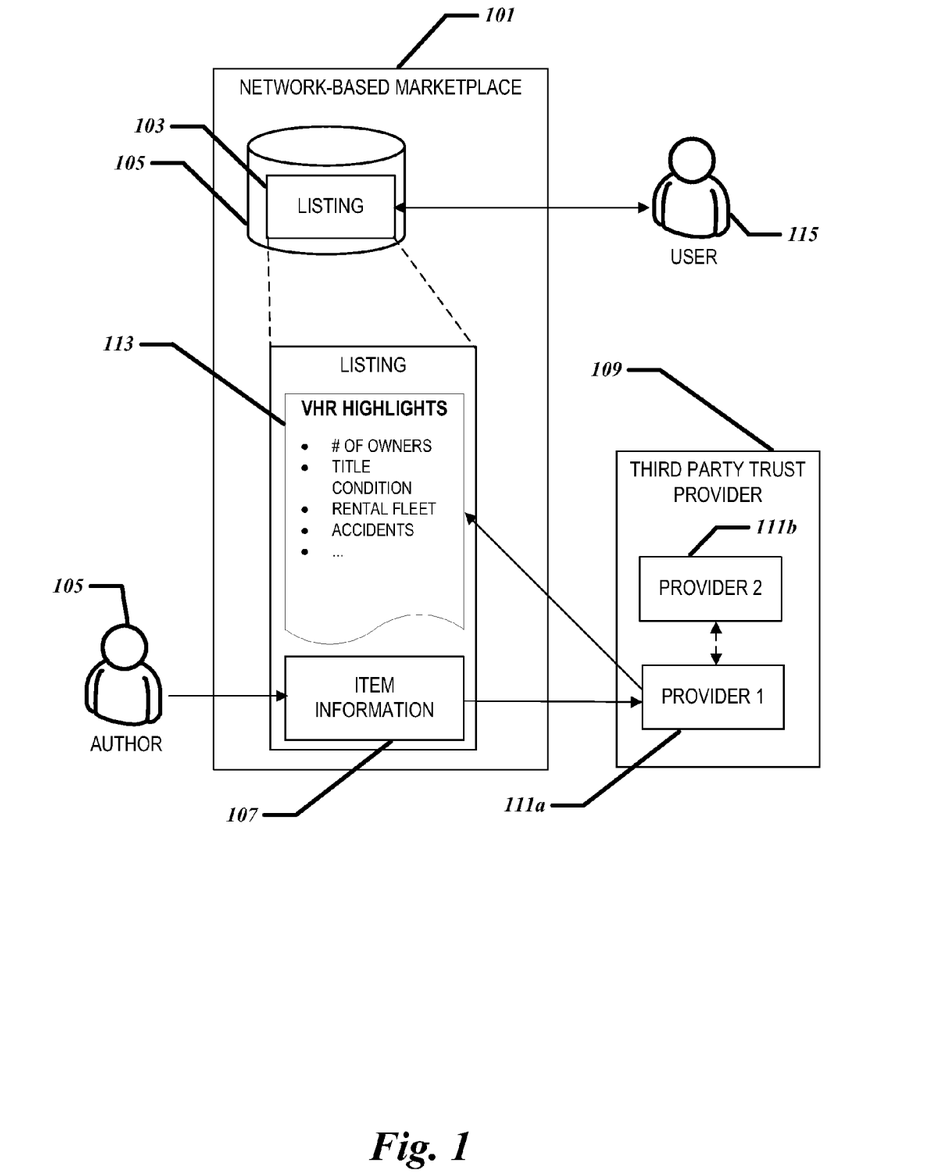
FIG. 1 is a block diagram illustrating an overview of example methods and systems to supplement a listing via a third party trust provider, according to one embodiment.

FIG. 1 is a block diagram illustrating an overview of example methods and systems to supplement a listing via a third party trust provider, according to one embodiment a network-based marketplace 101 may receive item information 107 from a first party in the form of an author 105 (e.g., seller). The network-based marketplace 101 may use the item information 107 to generate a listing 103 for the item. The item listing 103 may be viewed by a second party in the form of a user 115 (e.g., buyer) who subsequently purchases the item or wins the item in an auction. For example, the item may be a vehicle that is offered for sale on the network-based marketplace 101. Further, the item information 107 may include a description of the vehicle including a make, model, year, vehicle identification number (VIN), and other information.

The network-based marketplace 101, may, for example, store the item listing 103 on a queue and communicate the VIN number for the vehicle to a third party trust provider 109 requesting supplemental trust information 113 in the form of a VHR. The supplemental trust information 113 may include information for the item that is generated by the third party trust provider 109 based on predetermined criteria that are applied to the item. For example, the third party trust provider 109 may be AUTO-CHECK, a part of Experian® plc., a global leader in providing information, analytical and marketing services to organizations and consumers to help manage the risk and reward of commercial and financial decisions, the corporate headquarters of which is located in Dublin, Ireland. Also for example, the third party trust provider 109 may be CARFAX Inc., a provider of vehicle history information on all used cars and light trucks model year 1981 or later, with its corporate headquarters located in Fairfax Va., United States. In one embodiment, the third party trust provider 111a may provide supplemental trust information 113 that is generated by a fourth party trust provider 111b based on predetermined criteria that are applied to the item.

The third party trust provider 109 may communicate the supplemental trust information 113 in the form of a VHR to the network-based marketplace 101. The network-based marketplace 101 may, in turn, parse the VHR to generate VHR Summary Information, VHR Default Information, and VHR Expanded Information.

The network-based marketplace 101 may store supplemental trust information 113 in the item listings 103 with the item information 107 on a database 105. For example, the network-based marketplace 101 may store the VHR Summary Information, VHR Default Information, and VHR Expanded Information, each of which may be a portion of the supplemental trust information 113, in the item listings 103 with the item information 107. The user 115 (e.g., buyer) may then view the item listings 103 for the item, including item information 107 describing the vehicle and the supplemental trust information 113 describing the third party trust provider's 109 evaluation of the item (e.g., vehicle). In one embodiment the supplemental trust information 113 is automatically displayed with the item information 107 in the item listings 103. That is, the seller 105 may not have an option to decline presentation of the supplemental trust information 113. In one embodiment, the supplemental trust information 113 may be retrieved asynchronously from the third party trust provider 109 after receiving the item information 107 from the seller 105. In one embodiment, the supplemental trust information 113 may be retrieved by the network-based marketplace 101 in response to the item listings 103 being updated on the network-based marketplace 101. In one embodiment, the supplemental trust information 113 may be retrieved in response to an item being re-listed on the network-based marketplace 101. In one embodiment, the receipt or updating of the item listings 103 or the re-listing of an item may be considered an event associated with the item listing 103.

Figure 2:
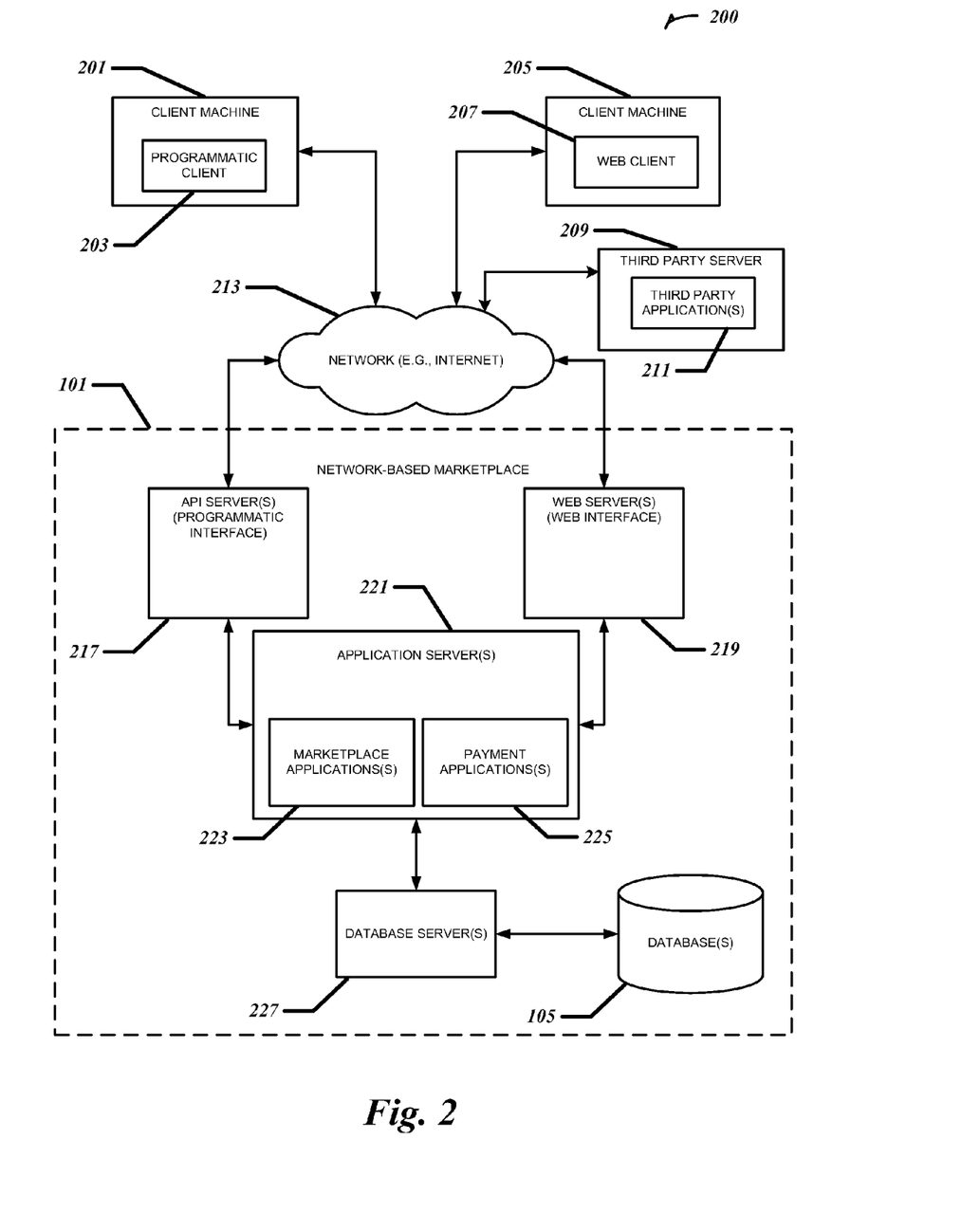
FIG. 2 is a network diagram depicting a client-server system within which one example embodiment may be deployed.

FIG. 2 is a network diagram depicting a system 200, according to one exemplary embodiment of the present disclosure, having a client-server and a peer-to peer architecture. A social networking system facilitates shopping activity, in the exemplary form of a network-based marketplace 101 communicating over a network 213. The network-based marketplace 101 communicates in a client-server architecture with clients. The network-based marketplace 101 provides server-side functionality, via the network 213 (e.g., the Internet), to one or more client machines 201 and 205. FIG. 2 illustrates, for example, a web client 207 (e.g., a browser, such as the Internet Explorer browser developed by Microsoft Corporation of Redmond, Wash. State) and a programmatic client 203 executing on respective client machines 205 and 201.

Turning to the network-based marketplace 101, an application program interface (API) server 217 and a web server 219 are coupled to, and provide programmatic and web interfaces respectively to, one or more application servers 221. The application servers 221 host one or more marketplace applications 223 and payment applications 225. The application servers 221 are, in turn, shown to be coupled to one or more databases servers 227 that facilitate access to one or more databases 105.

Marketplace applications 223 provide a number of marketplace functions and services to users that access the network-based marketplace 101. The payment applications 225 likewise provide a number of payment services and functions to users. For example, the payment applications 225 may allow users to account for and accumulate value (e.g., in a commercial currency, such as the U.S. dollar, or a proprietary currency, such as "points") in accounts, and then later to redeem the accumulated value for products (e.g., goods or services) that are made available via the marketplace applications 223. While the marketplace and payment applications 223 and 225 are shown in FIG. 2 to both form part of the network-based marketplace 101, it will be appreciated that, in alternative embodiments of the present disclosure, the payment applications 225 may form part of a payment service that is separate and distinct from the marketplace 101. The network-based marketplace 101 may be embodied as the eBay, The Worlds Online Marketplace®, provided by eBay, Inc. of San Jose, Calif.

Further, while the system 200 shown in FIG. 2 employs a client-server architecture and a peer-to-peer architecture, the present disclosure is, of course, not limited to such an architecture, and could equally well find application in any combination of client-server, distributed, or peer-to-peer, architecture systems. The various marketplace and payment applications 223 and 225 could also be implemented as standalone software programs, which do not necessarily have networking capabilities.

Web client 207, it will be appreciated, accesses the various marketplace and payment applications 223 and 225 via the web interface supported by the web server 219. Similarly, the programmatic client 203 accesses the various services and functions provided by the marketplace and payment applications 223 and 225 via the programmatic interface provided by the API server 217. The programmatic client 203 may, for example, be a seller application (e.g., the TurboLister application developed by eBay Inc., of San Jose, Calif.) to enable sellers to author and manage listings (e.g., items) on the marketplace 101 in an off-line manner, and to perform batch-mode communications between the programmatic client 203 and the network-based marketplace 101.

FIG. 2 also illustrates a third party application 211, executing on a third party server machine 209, as having programmatic access to the network-based marketplace 101 via the programmatic interface provided by the API server 217. For example, the third party application 211 may, utilizing information communicated from the network-based marketplace 101, support one or more features or functions on a website hosted by the third party. The third party website may, for example, be hosted by a third party trust provider 109 (e.g., CARFAX, AutoCheck) that provides supplemental trust information 113 for items (e.g., vehicles) that are utilized by the relevant applications of the network-based marketplace 101.

Figure 3:
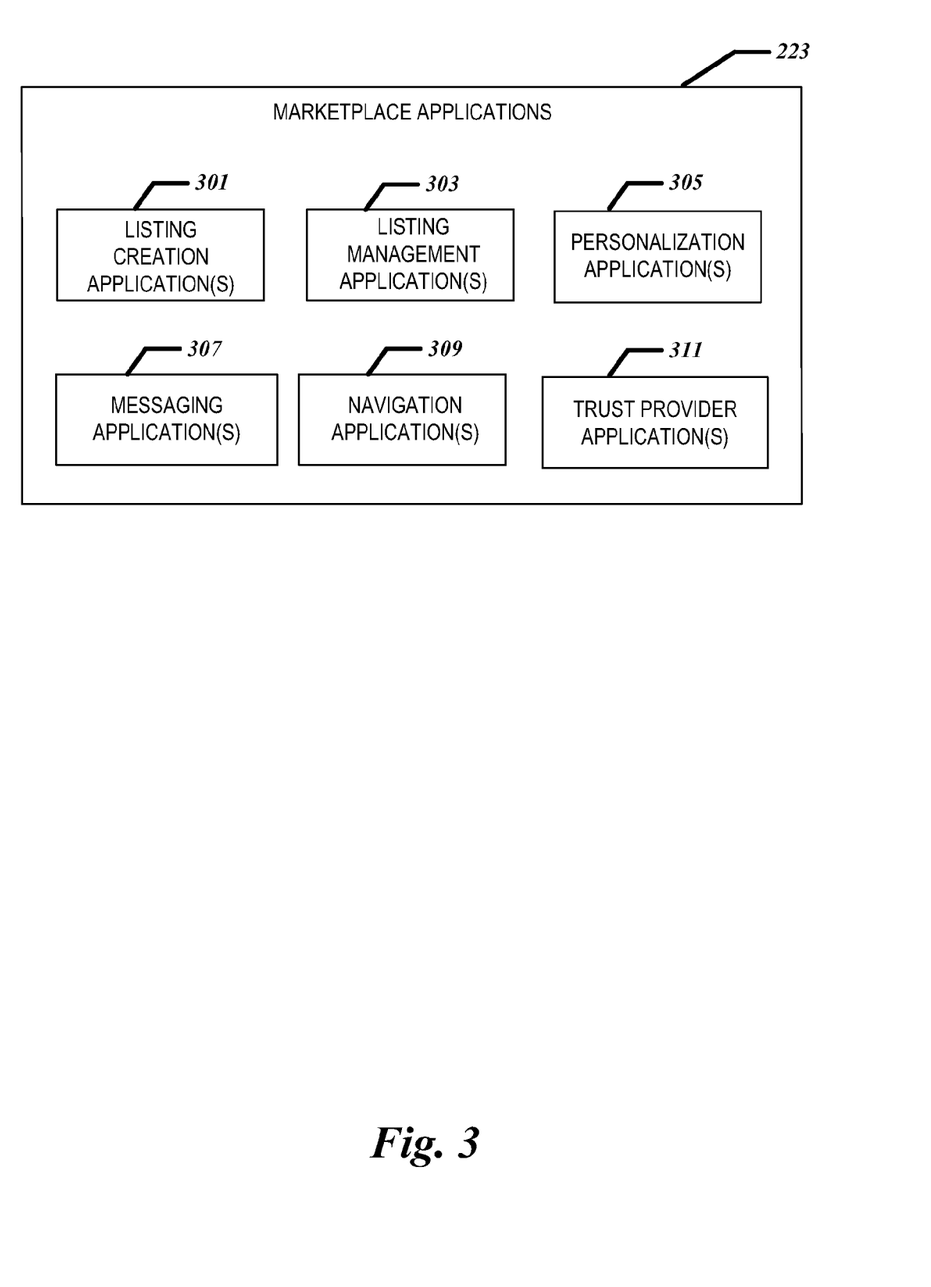
FIG. 3 is a block diagram illustrating multiple applications that, in one example embodiment, are provided as part of the networked system shown in FIG. 2.

FIG. 3 is a block diagram illustrating multiple marketplace 223 applications that, in one exemplary embodiment of the present disclosure, are provided as part of the network-based marketplace 101. The network-based marketplace 101 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 223 may include one or more auction applications (not shown) to support auction-format listing and price setting mechanisms (e.g., English, Dutch, Vickrey, Chinese, Double, Reverse auctions etc.). The various auction applications may also provide a number of features in support of such auction-format listings, such as a reserve price feature, whereby a seller may specify a reserve price in connection with a listing, and a proxy-bidding feature, whereby a bidder may invoke automated proxy bidding.

Listing creation applications 301 allow sellers to conveniently author listings pertaining to goods or services that they wish to transact via the network-based marketplace 101 and listing management applications 303 allow sellers to manage such listings. Specifically, where a particular seller has authored and/or published a large number of listings, the management of such listings may present a challenge. The listing management applications 303 provide a number of features (e.g., auto re-listing, inventory level monitors, etc.) to assist the seller in managing such listings. In some embodiments, the listing creation applications 301 may force the seller to include a valid identifier for an item. For example, for a vehicle, the seller may be required to include a valid VIN.

Listing management applications 303 may also use supplemental trust information 113 in order to inform sellers of problems with an item or to take action on an item, according to some embodiments. For example, if a seller specifies a title brand that does not match the title brand according to the VHR report, the following actions, according to an embodiment, may be taken: communicate a message to the seller notifying the seller that the item listing is being removed from the network-based marketplace; remove the item listings from the network-based marketplace; and automatically refund fees. The detected title brand mismatch between the listing 103 and the supplemental trust information 113 may be known as a trigger. Several different triggers and responses to the triggers are contemplated, such as a warning over a mismatch between a predetermined criterion (e.g., odometer reading) of the item listings 103 and the supplemental trust information 113. Messaging applications 307, described in more detail below, may in some embodiments be used to communicate warnings, remedies, or notifications to a user. In some embodiments, the process to retrieve supplemental trust information 113 may be enabled or disabled by the listing management applications 303.

Personalization applications 305 allow users of the network-based marketplace 101 to personalize various aspects of their interactions with the network-based marketplace 101. For example a user may, utilizing an appropriate personalization application 305, create a personalized reference page at which information regarding transactions to which the user is (or has been) a party may be viewed. Further, a personalization application 305 may enable a user to personalize listings and other aspects of their interactions with the network-based marketplace 101 and other parties.

Personalization applications 305 may include a Notification Preference Page (e.g., user interface), which may receive parameters to configure communications in response to a trigger, according to one embodiment. For example, the Notification Preference Page may receive a parameter "None" to configure no communication by email in response to a trigger or a parameter, "Real-time" to configure a communication by email in real-time in response to a trigger. In some embodiments, the parameters may also specify one or more preferred forms for notifications (e.g., email, short message service (SMS), web-based note system, etc.). The trigger may be based on a third party trust provider 109 related event. For example, the third party trust provider 109 related event may include the network-based marketplace 101 removing an item listing 103 based on the supplemental trust information 113 (e.g., VHR report) that is received from a third party trust provider 109. Also, for example, the third party trust provider 109 related event may include the network-based marketplace 101 identifying an issue with a vehicle based on a the supplemental trust information 113 (e.g., VHR report) that is received from a third party trust provider 109.

In one embodiment, the network-based marketplace 101 may support a number of marketplaces that are customized, for example, for specific geographic regions. A version of the network-based marketplace 101 may be customized for the United Kingdom, whereas another version of the network-based marketplace 101 may be customized for the United States. Each of these versions may operate as an independent marketplace, or may be customized (or internationalized) presentations of a common underlying marketplace. For example, different sets of trust providers 109 may be used to service customers in different countries.

Messaging applications 307 are responsible for the generation and delivery of messages to users of the network-based marketplace 101, with such messages, for example, advising users regarding the status of listings 103 at the network-based marketplace 101 (e.g., providing "outbid" notices to bidders during an auction process or providing promotional and merchandising information to users). Messaging applications 307 may communicate messages to, for example, a seller having a problem between the item information 107 and the supplemental trust information 113. In some embodiments, these messages may describe the actions taken by the network-based marketplace 101, and/or the issues identified by the network-based marketplace 101. In some embodiments, the following table may reflect some events related to item information 107 and supplemental trust information 113 and possible actions taken by the network-based marketplace 101:

| Result | Description | Action |
|---|---|---|
| Success (No Frame Damage) | Expected results delivered | Item is removed from queue |
| Success - w/ | Expected results delivered. | Item is handled |

-continued

| Result | Description | Action |
|---|---|---|
| Major Issue | Major Title or Accident Damage Event found | like success w/ additional requirement |
| Success - Title Brand Mismatch | User lists title as clean - title comes back as something other than clean | Item is flagged |
| Fail - No Response/ Bad Response | Sent listing to partner, invalid response returned | Item remains in queue. |
| Fail - Invalid VIN | Sent listing to partner. Partner says this is invalid VIN | Item flagged as "Invalid VHR" |
| Fail - No VHR | Partner responds to say that there is no VHR for this VIN | Item flagged as "No VHR" |

In some embodiments, the message may take the form of an email or a web page. In some embodiments, the email or the web page may include information specific to the item listing 103 and, in some examples, one or more links or other user interface elements allowing the user to take an action (e.g., a button to re-list the item). In some embodiments these messages may be stored in a notes system.

Navigation of the network-based marketplace 101 may be facilitated by one or more navigation applications 309. For example, a search application enables key word searches of listings published via the marketplace 101. A browse application allows users to browse various category, catalog, or inventory data structures according to which listings may be classified within the marketplace 101. Various other navigation applications 309 may be provided to supplement the search and browsing applications. Various navigation applications 309 may also be used to display an item listing 103, including a user interface having an element to display some, all, or a form of, the supplemental trust information 113. The user interface, in some embodiments, may also include a user option (e.g., hyperlink, button, etc.) to get a more detailed or complete view of the supplemental trust information 113. The more detailed view of the supplemental trust information 113 may, in some embodiments, appear within the user interface (e.g., web page for the item listing 103), may be a pop-up window (e.g., a separate browser window or hypertext markup language (HTML) based component that appears to be a window in the web page), or may be a separate web page to which the navigation applications 309 direct the browser.

In one embodiment, a user interface of the supplemental trust information 113 may display the supplemental trust information hierarchically, hiding details at each level of the hierarchy, until a user selects a user interface component to expand the level. For example, VHR 113 may be initially displayed with the following fields: title (descriptive, e.g., "Sport Pkg—Sky Window—excellent condition"), mileage, location, vehicle information, and features. After a user selects vehicle information, the user interface may expand the displayed data to include, for example, the following fields: VIN Inspection Warranty Vehicle title (status, e.g., clear), condition, and For sale by, among others. In some embodiments, the supplemental trust information 113 is divided, with a portion visible in the user interface and a portion hidden until a user selects a user interface element to reveal the additional information. For example, a "more information" link may be at the bottom of a web page displaying the supplemental trust information 113, and additional information may be displayed when a user selects the link.

Trust provider applications 311 may support the retrieval of supplemental trust information 113 for items featured by listings on the network-based marketplace 101. For example, the trust provider applications 311 may be utilized to retrieve supplemental trust information from a third party trust provider 109, process the supplemental trust information 113, and store the supplemental trust information 113 in an item listing 103 for subsequent display to users. In some embodiments, retrieving supplemental trust information 113 may be disabled. In some embodiments, the supplemental trust information 113 may be in a variety of formats that the trust provider applications may process. For example, for vehicles, the following formats of supplemental trust information 113 may be processed: For-Sale-By-Owner ("FSBO") classifieds, National classifieds, and Dealer classifieds, to name a few.

Figure 4:
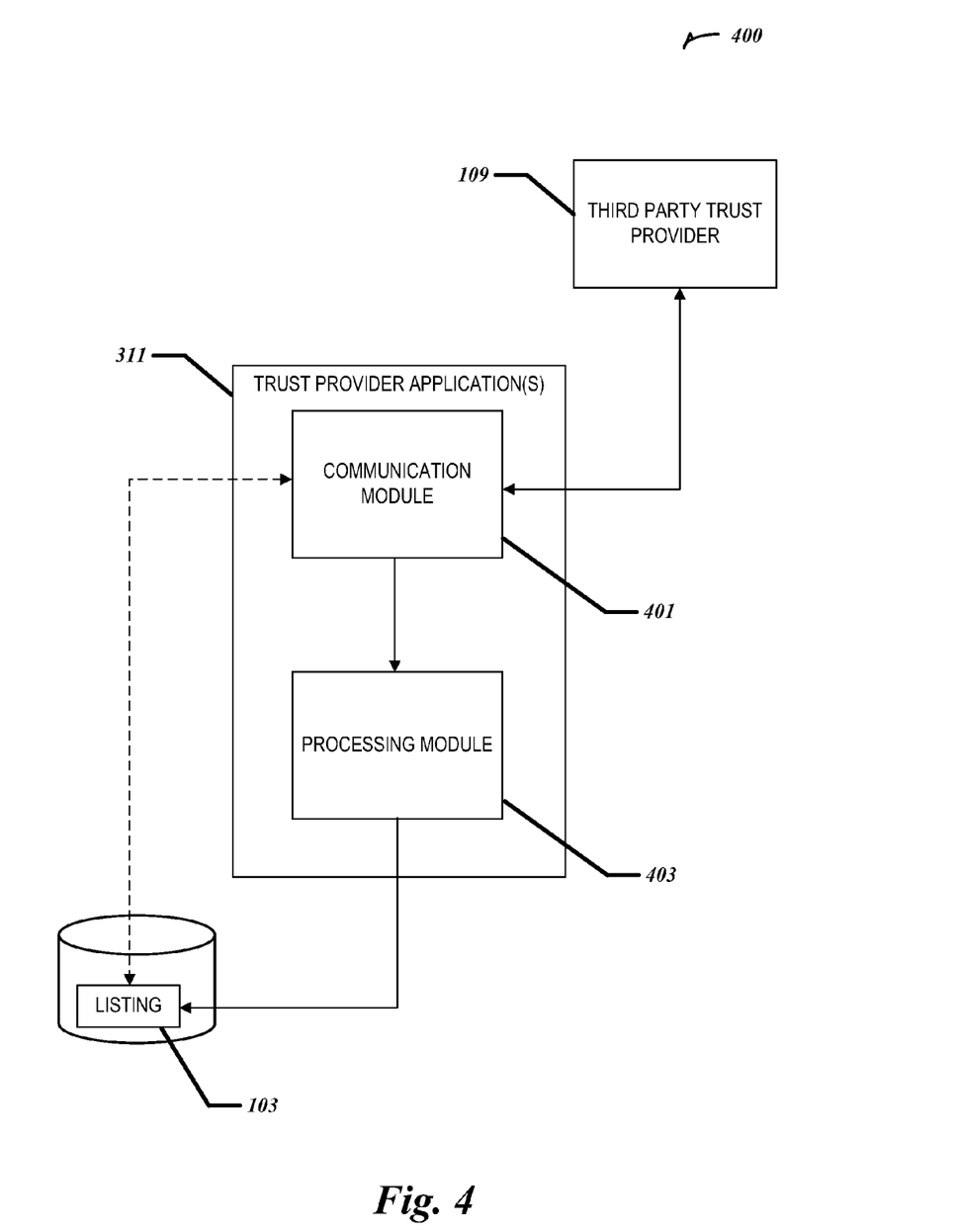
FIG. 4 is a block diagram illustrating an example system including example components of trust provider applications, according to one embodiment.

FIG. 4 is a block diagram illustrating example system 400, including example components of trust provider applications 311, according to one embodiment. System 400 may include the trust provider applications 311, a third party trust provider 109, and an item listing 103. Trust provider applications 311 may include a communication module 401 communicatively coupled to the third party trust provider 109, and a processing module 403 with access to the item listings 103. In some embodiments, the communication module 401 may also have access to the item listings 103.

Communication module 401 may be configured to request supplemental trust information 113 from the third party trust provider 109 responsive to an event associated with the item listing 103. In some embodiments, the request includes one or more predetermined criteria from the item listing 103. Example predetermined criteria may include a VIN for a vehicle listing 103, a serial number, or other unique identifier of the item. In some embodiments, the event may be one of listing an item, re-listing an item, or revising the item listing 103. In some embodiments, the communication module 401 may make the request asynchronously. For example, after the item listing 103 is submitted to the network-based marketplace 101, the communication module 401 may make the request to the third party trust provider 109 and allow the item listings 103 to be posted without waiting for the response to the request. In some embodiments, the third party trust provider 109 may provide supplemental trust information 113 in the form of a complete VHR. The communication module 401 may provide the supplemental trust information 113 to the processing module 403 after the supplemental trust information 113 is received from the third party trust provider 109.

Processing module 403 may be configured to store at least a portion of the supplemental trust information 113 in the item listing 103. In some embodiments, the whole of the supplemental trust information 113 may be stored in the item listing 103. In some embodiments, the processing module may produce a summary of the supplemental trust information 113, which may then be stored in the item listing 103. In some embodiments, the summary of the supplemental trust information 113 may be a VHR summary.

Processing module 403 may also be configured to present a notification to a user in response to a trigger, where the trigger may be based on the supplemental trust information 113 stored in the item listing 103. In some embodiments, the trigger may be based on a mismatch between at least one predetermined data field of the item listing 103 and a corresponding data field in the supplemental trust information 113 stored in the item listing 103. In such circumstances, the notification may be presented to the author of the item listing 103. For example, if the predetermined data field is a Boolean indicating that an accident has not occurred for a vehicle, and the associated field(s) in the supplemental trust information 113 stored in the item listing 103 indicates that an accident has occurred, the seller of the vehicle may receive an email notification indicating the discrepancy. In some embodiments, notifications to the author of the item listing 103 may include information about the removal of item listing 103 from the network-based marketplace 101, where the item listing 103 was removed based on the supplemental trust information 113 stored in the item listing 103. In some embodiments, notifications to the author of the item listing 103 may include a request to review the item listing 103 and a listing policy associated with the supplemental trust information 113. In some embodiments, the notification may be communicated in accordance with the author's preference. For example, an author may be able to specify the format of the notification (e.g., email or a web-based notes system, among others) as well as the type of triggers (e.g., title problem) and/or the severity of triggers that will initiate the notification. In some embodiments, notifications to the author of an item listing 103 may be stored in a notes system (not shown).

In some embodiments, the notification may be to a user viewing the item listing 103. The notification may take the form of a visual element in a user interface to present the item listing 103 to the user. In some examples, the trigger may be the content of the supplemental trust information 113 stored in the item listing 103. For example, if a user views the item listing 103 and the supplemental trust information 113 is empty or absent (absent being considered equivalent to empty), then no notification may be shown, or a visual element indicating that no supplemental trust information 113 is available for this item listing 103 may be shown. Conversely, if the supplemental trust information 113 stored in the item listing 103 is not empty, some or all of the supplemental trust information 113 may be displayed to the user. In some embodiments, the information displayed to the user may vary based on the content of the supplemental trust information 113 stored in the item listing 103.

Figure 5:
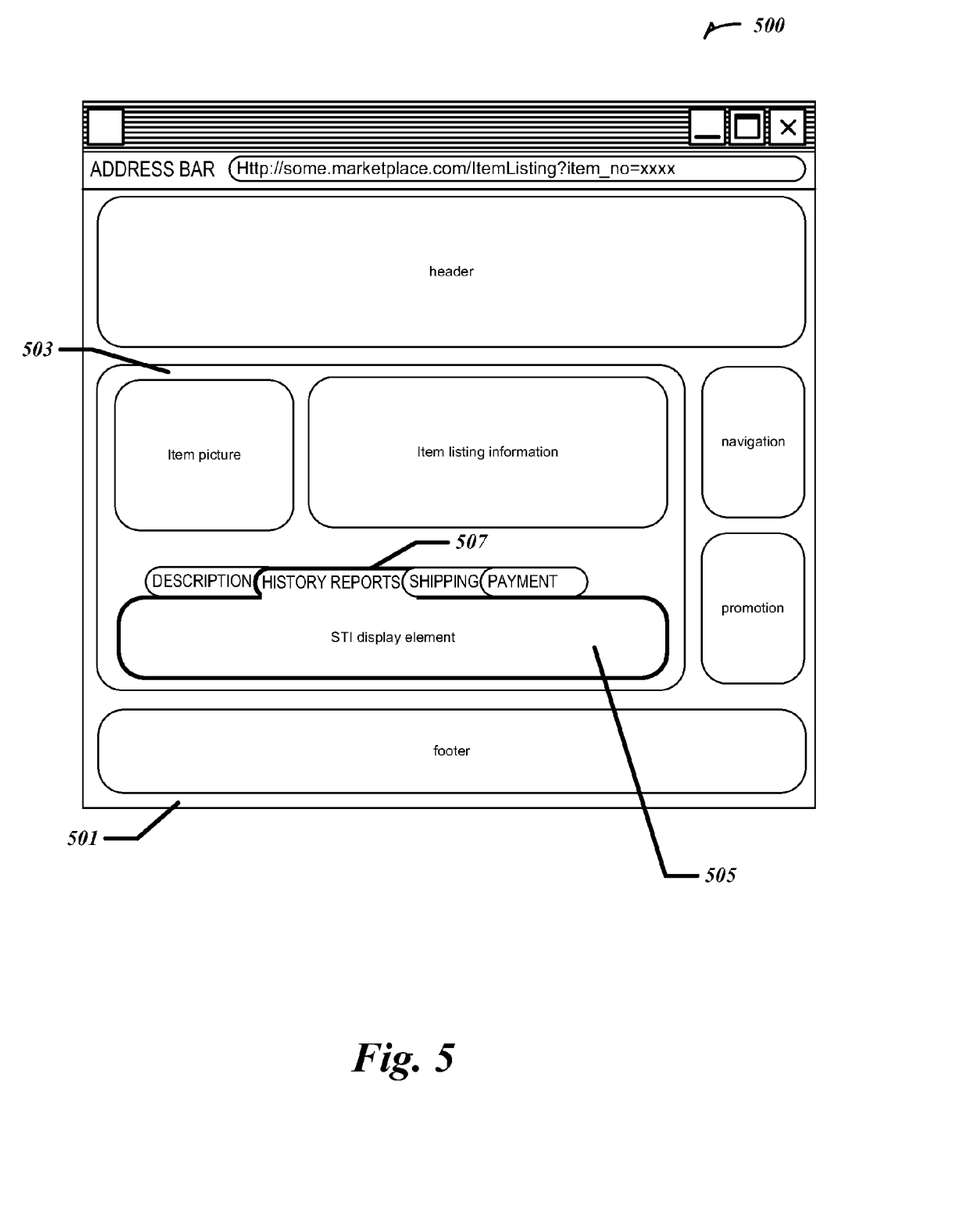
FIG. 5 illustrates an example user interface to display supplemental trust information to a user, according to one embodiment.

FIG. 5 illustrates an example user interface 500 to display supplemental trust information to a user, according to one embodiment. Interface 500 may include a web page 501 of the network-based marketplace 101, which may further include an item listing display element 503. The item listing display element 503 may include a visual element 505 to display the supplemental trust information 113. The content of visual element 505 is discussed in greater detail below in reference to FIG. 6. In some embodiments, the user interface 500, web page 501, item listing display element 503, visual element 505, or any combination thereof, may include one or more user interfaces (e.g., links, buttons, clickable icons, etc.) to share the item listing 103 with one or more entities via social networking channels (e.g., email, Facebook, Twitter, etc.).

In some embodiments, the item listing display element 503 may include a tab 507, or other user interface element, to allow a user to choose to view the supplemental trust information 113. For example, for a vehicle listing, the tab may be a "History Reports" tab, which when clicked, causes visual element 505 to become visible. In some embodiments, visual element 505 is always visible.

Figure 6:
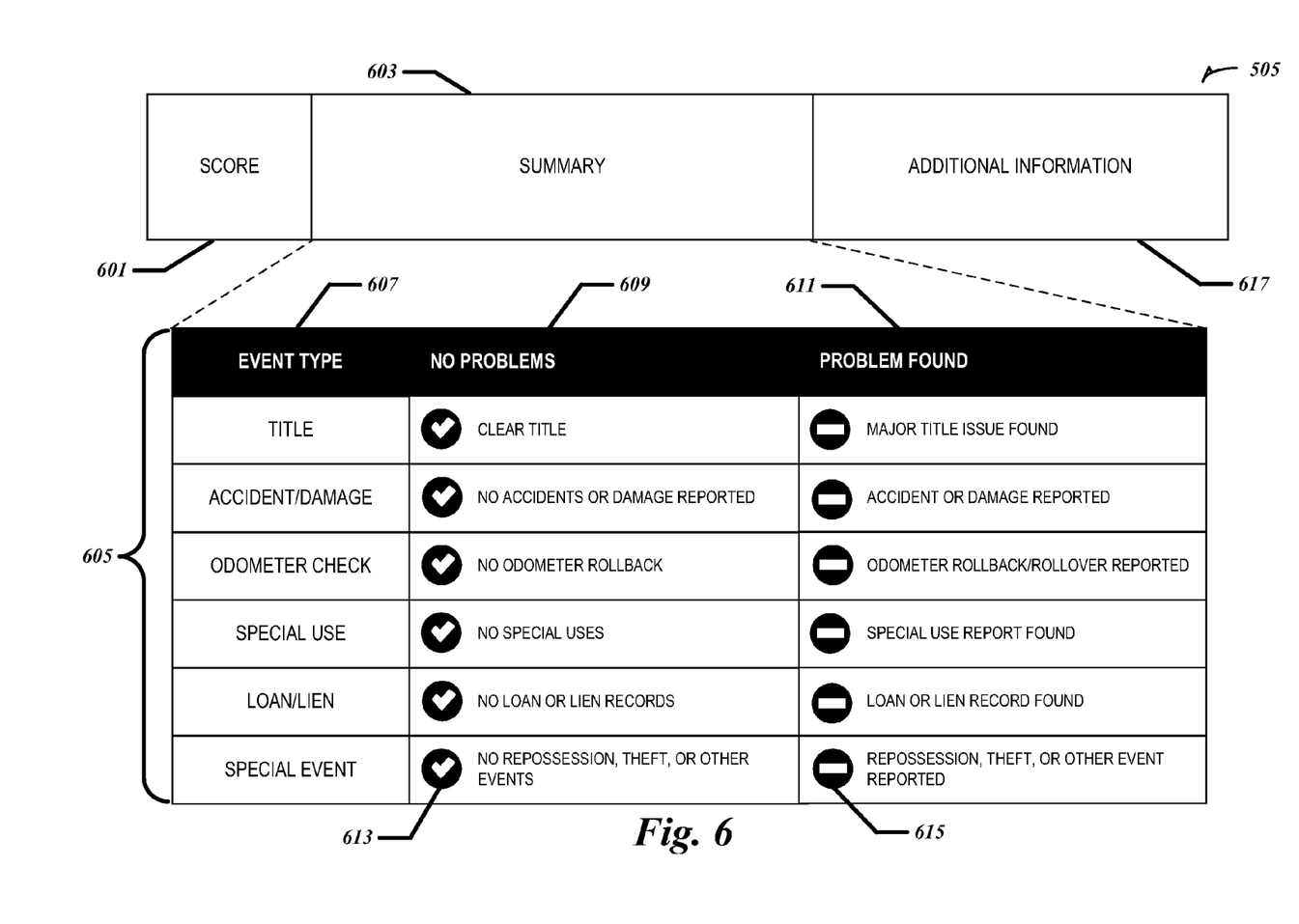
FIG. 6 illustrates a detailed user interface element to display supplemental trust information to a user, according to one embodiment.

FIG. 6 illustrates a detailed user interface visual element 505 to display supplemental trust information 113 to a user, according to one embodiment. Although FIG. 6 illustrates an example visual element 505 to display VHR information, it will be understood that similar organization and themes may be applied to other products and forms of supplemental trust information 113, such as jewelry or works of art.

Element 601 may be a score summarizing the contents of the supplemental trust information 113. For example, the score may be an AutoCheck Score. In some embodiments, element 601 may also include demographic information about the score (e.g., a range of scores for similar vehicles). In some embodiments, element 601 may include a link, or other user interface element, to allow a user to access information about the score. In some embodiments, the third party trust provider may be identified in element 601.

Element 603 may include a visual summary of the supplemental trust information 113. In some embodiments, element 603 may include information about one or more of event types 607 shown in table 605. In some embodiments, each event type 607 is represented in element 603. In some embodiments, for a given event type 607 (e.g., "Title"), the associated text 609 may be displayed if there is no problem with the item listing 103 with respect to the particular event type 607. In some embodiments, the text 609 may be replaced, or supplemented, with an icon 613 indicating a positive value (e.g., a green check or other visuals) for the event type 607. In some embodiments, for a given even type 607, associated text 611 may be displayed if a problem is found with the item listing 103 with respect to the event type 607. In some embodiments, text 611 may be replaced, or supplemented, with an icon 615 indicating a negative value (e.g., a red "x", a stop sign, a yellow triangle, an exclamation point, or other visuals) for the event type 507. In some embodiments, problems or issues identified with an item listing 103 may be minor or major, and the icon 615 may change to reflect the severity of the problem. In this way, users may quickly access the supplemental trust information 113 and then decide whether to investigate further. This may save time and effort for users and is thus likely to enhance the users' experience.

Element 617 may provide additional information. For example, element 617 may display the number of owners of a vehicle, the VIN, the number of service records for the vehicle, and the last odometer reading of the vehicle. In some embodiments, element 617 may include a link, or other user interface element, to a complete set of additional information from the supplemental trust information 113. In some embodiments, the additional information may be displayed in a collapsible form, allowing the user to expand and reveal portions of the additional information of interest to the user while hiding the rest. In some embodiments, element 617 allows the user to navigate to another location (e.g., web site). In some embodiments, the other location is hosted or controlled by the third party trust provider 109.

Figure 7:
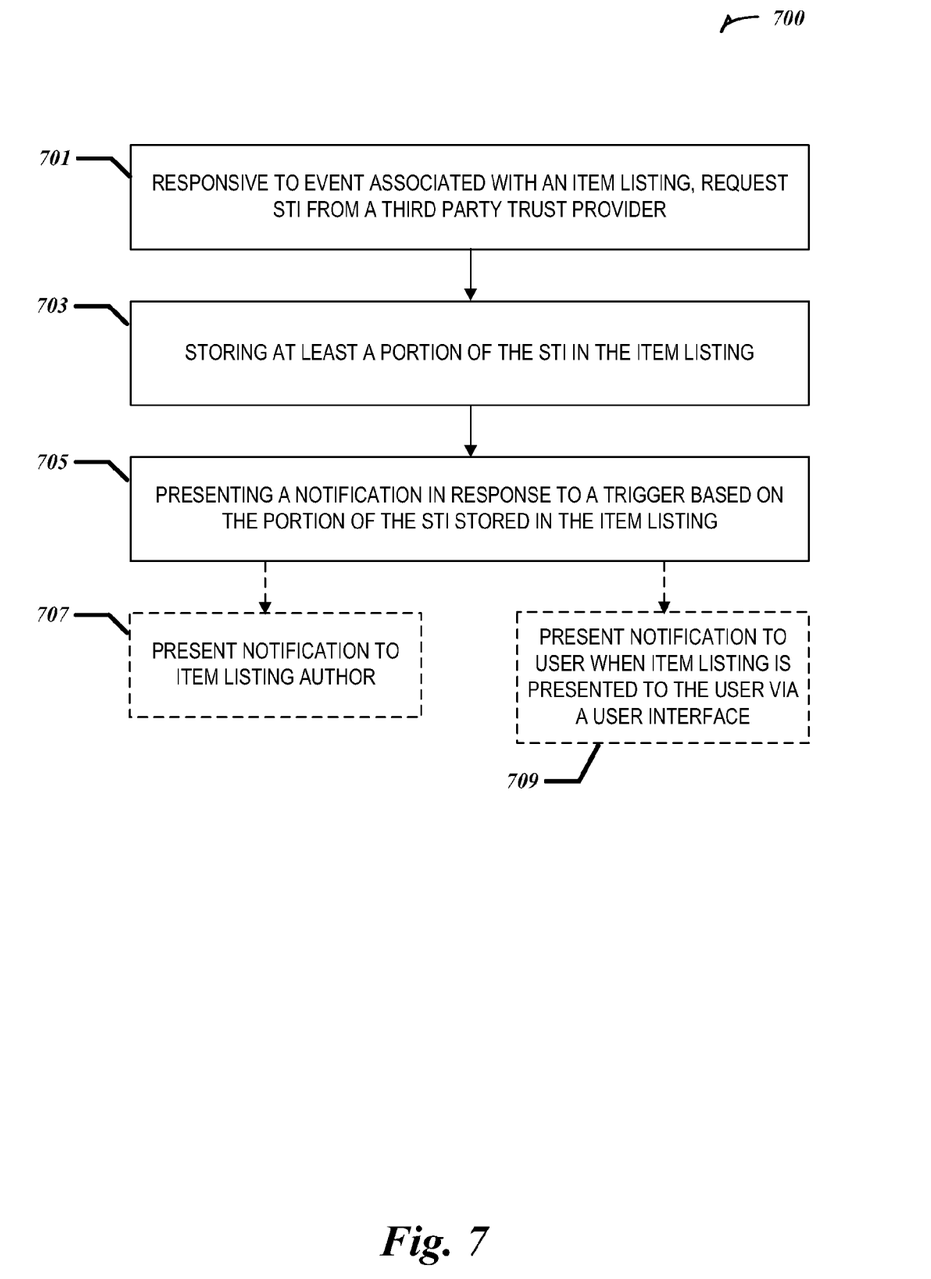
FIG. 7 is a flowchart illustrating an example method to supplement a listing via a third party trust provider, according to one embodiment.

FIG. 7 is a flowchart illustrating an example method 700 to supplement a listing via a third party trust provider, according to one embodiment. Components from FIGS. 1-6 may be used below to illustrate method 700; however, it will be understood that other components, or component arrangements, may also be used to implement method 700.

At 701, responsive to an event associated with an item listing 103, supplemental trust information 113 (shown as STI) from a third party provider 109 using at least one predetermined criterion from the item listing 103 may be requested. In some embodiments, the predetermined criterion may be a VIN. In some embodiments, the supplemental trust information 113 may include a VHR. In some embodiments, the event associated with the item listing 103 may be listing an item, re-listing an item, or revising the item listing 103.

At 703, at least a portion of the supplemental trust information 113 may be stored in the item listing 103. In some embodiments, the supplemental trust information 113 stored in the item listing 103 may be a VHR summary.

At 705, a notification in response to a trigger based on the supplemental trust information 113 stored in the item listing 103 may be presented. In some embodiments, the trigger may be a mismatch between one or more predetermined data fields of the item listing 103 and corresponding data fields of the supplemental trust information 113 stored in the item listing 103. In some embodiments, the trigger may be the content of the supplemental trust information 113 stored in the item listing 103 when the item listing 103 is viewed by a user.

At 707, the notification may optionally be presented to an author of the item listing 103 when there is a problem identified with the item listing 103 based on the supplemental trust information 113. In some embodiments, the notification may be an email. In some embodiments, the notification may be a web-based note, or other message based communication mechanism. In some embodiments, the notification may be stored in a notes system. In some embodiments, the notification may inform the author that the item listing 103 has been removed from the network-based marketplace 101. In some embodiments, the notification may include a request for the author to review the item listing 103. In some embodiments, the request to review the item listing 103 may include a listing policy associated with the supplemental trust information 113 stored in the item listing 103. In some embodiments, the notification may be communicated to the author in accordance with the author's preferences. For example, a user interface may be provided to authors to select notification preferences, such as the events the authors wish to be notified of (e.g., title problem, or high priority) as well as the mode of communication (e.g., email).

At 709 the notification may optionally be presented to a user viewing the item listing 103, the trigger being the content of the supplemental trust information 113 in the item listing 103 when the item listing 103 is presented to the user. In some embodiments, the notification may be a visual element, such as the one described in FIG. 6, of the user interface displaying the item listing 103, with the visual element display information related to the supplemental trust information 113 stored in the item listing 103. In some embodiments, the visual element may display a summary of the supplemental trust information 113 stored in the item listing 103. In some embodiments, the visual element may include a user option to display a report with more detail than the summary.

Figure 8:
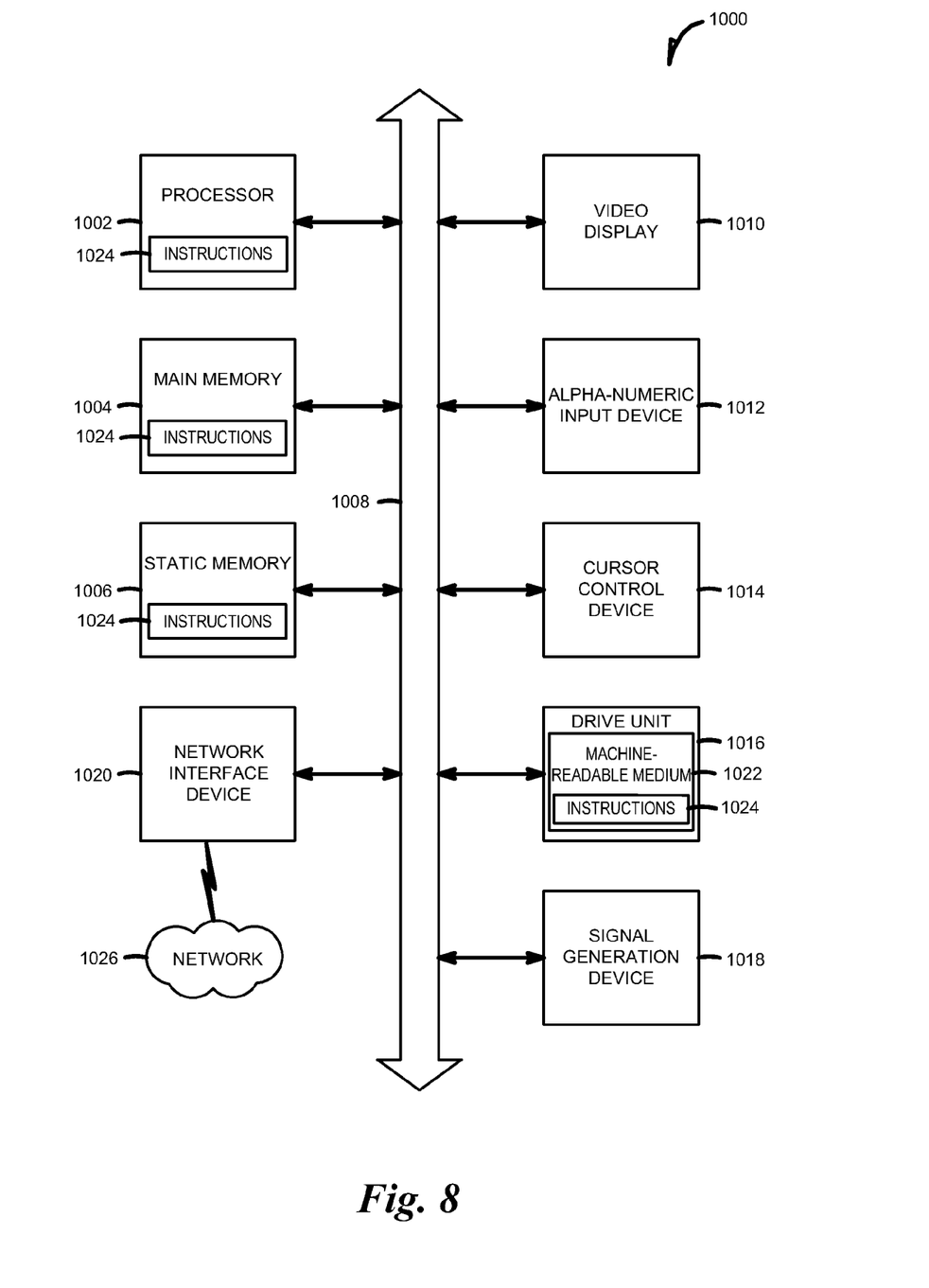
FIG. 8 is a diagrammatic representation illustrating a machine in the example form of a computer system, which may be may be part of an example embodiment.

FIG. 8 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

Disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004, static memory 1006, and/or within the processor 1002 during execution thereof by the computer system 1000, the main memory 1004, the static memory 1006, and the processor 1002 also constituting machine-readable media.

Software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

We claim:

1. A system comprising:
one or more hardware processors;
a communication module configured to use the one or more hardware processors to:
request supplemental trust information (STI), from over a network, from a third party trust provider communicatively coupled to the communication module, the request includes a first predetermined criterion from an item listing that describes a particular item that is being offered for sale on a network-based marketplace, the STI includes history information for the particular item that is generated by the third party trust provider that uses a second predetermined criterion that is applied to the particular item; and
a processing module configured to:
store at least a portion of the STI in the item listing;
identify a misrepresentation of the item in the item listing by determining a mismatch between at least one predetermined data field of the item listing and a corresponding data field of the at least a portion of the STI; and
present, over the network, an interface that includes at least a portion of the STI stored in the item listing including the identified misrepresentation, the presentation is responsive to a request to display the STI.

2. The system of claim 1, wherein the communication module presents a notification in response to a trigger based on the portion of the STI stored in the item listing.

3. The system of claim 1, wherein the first predetermined criterion is a vehicle identification number (VIN).

4. The system of claim 1, wherein the history information includes trust information for the particular item, wherein the particular item is selected from a group of particular items including a particular antique, a particular craft, a particular artistic creation, a particular gem, a particular musical instrument, a particular motorcycle and a particular boat.

5. The system of claim 4, wherein the at least a portion of the STI is a VHR summary.

6. The system of claim 2, wherein the request is responsive to an identification of an event that is associated with the item listing, and wherein the event associated with the item listing is selected from a group of events consisting of listing the particular item, re-listing the particular item, or revising the item listing.

7. The system of claim 6, wherein the trigger based on the at least a portion of the STI is a mismatch between at least one predetermined data field of the item listing and a corresponding data field of the at least a portion of the STI, and wherein the notification is presented to an author of the item listing.

8. The system of claim 7, wherein the notification describes a removal of the item listing, wherein the removal is responsive to the trigger based on the at least a portion of the STI.

9. The system of claim 7, further comprising a notes system and wherein the notification includes a request, to the author, to review the item listing and a listing policy associated with the at least a portion of the STI, wherein the notification is communicated in accordance with the preferences of the author, and further wherein the notification is stored in the notes system.

10. The system of claim 2, further comprising a user interface to present the item listing to a user, and wherein the notification is a visual element of the user interface, the visual element includes information related to the at least a portion of the STI, and wherein the trigger based on the at least a portion of the STI is content from the at least a portion of the STI.

11. The system of claim 10, wherein the visual element includes a summary of the at least a portion of the STI and an option that is selectable to display a report with information than the summary.

12. A computer-implemented method comprising:
requesting, using one or more hardware processors, supplemental trust information (STI), from over a network, from a third party trust provider, the requesting the STI utilizing a first predetermined criterion from an item listing that describes a particular item that is being offered for sale on a network-based marketplace, the STI including history information for the particular item that is generated by the third party trust provider using a second predetermined criterion that is applied to the particular item;
storing at least a portion of the STI in the item listing;
identifying a misrepresentation of the item in the item listing by determining a mismatch between at least one predetermined data field of the item listing and a corresponding data field of the at least a portion of the STI; and
presenting, over the network, an interface that includes at least a portion of the STI stored in the item listing including the identified misrepresentation, the presenting being responsive to a request to display the STI.

13. The computer-implemented method of claim 12, further comprising presenting a notification in response to a trigger based on the portion of the STI stored in the item listing.

14. The computer-implemented method of claim 12, wherein the first predetermined criterion is a vehicle identification number (VIN).

15. The computer-implemented method of claim 12, wherein the history information includes trust information for the particular item, wherein the particular item is selected from a group of particular items including a particular antique, a particular craft, a particular artistic creation, a particular gem, a particular musical instrument, a particular motorcycle and a particular boat.

16. The computer-implemented method of claim 12, wherein the at least a portion of the STI is a VHR summary.

17. The computer-implemented method of claim 12, wherein the requesting is responsive to identifying an event that is associated with the item listing, wherein the event associated with the item listing is selected from a group of events consisting of listing the particular item, re-listing the particular item, or revising the item listing.

18. The computer-implemented method of claim 17, wherein the trigger based on the at least a portion of the STI is a mismatch between at least one predetermined data field of the item listing and a corresponding data field of the at least a portion of the STI, and wherein the notification is presented to an author of the item listing.

19. The computer-implemented method of claim 18, wherein the notification informs the author that the item listing is removed.

20. The computer-implemented method of claim 18, wherein the notification requests the author to review the item listing, the notification including a listing policy associated with the at least a portion of the STI, the notification being communicated in accordance with preferences of the author of the particular item, and the notification being stored in a notes system.

21. The computer-implemented method of claim 13, wherein the trigger based on the at least a portion of the STI includes content of the at least a portion of the STI and wherein the notification is a visual element of the interface, the visual element displaying information related to the at least a portion of the STI.

22. The computer-implemented method of claim 21, wherein the visual element displays a summary of the at least a portion of the STI and a user option to display a report with more detail than the summary.

23. A non-transitory machine-readable medium storing instructions that, when executed by a machine, cause the machine to:
  request supplemental trust information (STI), from over a network, from a third party trust provider, wherein the requesting the STI utilizes a first predetermined criterion from an item listing that describes a particular item that is offered for sale on a network-based marketplace, the STI includes history information for the particular item that is generated by the third party trust provider that utilizes a second predetermined criterion that is applied to the particular item;
  store at least a portion of the STI in the item listing;
  identify a misrepresentation of the item in the item listing by determining a mismatch between at least one predetermined data field of the item listing and a corresponding data field of the at least a portion of the STI; and
  present, over the network, an interface that includes at least a portion of the STI stored in the item listing including the identified misrepresentation, the presentation is responsive to a request to display the STI.

* * * * *